United States Patent
Oneil et al.

(10) Patent No.: US 6,497,505 B2
(45) Date of Patent: *Dec. 24, 2002

(54) LIGHT MANIFOLD ASSEMBLY

(75) Inventors: David Allen Oneil, Wayne, PA (US); Timothy Fohl, Carlisle, MA (US); Jeffrey Paul Nold, Livonia, MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/815,109

(22) Filed: Mar. 22, 2001

(65) Prior Publication Data

US 2002/0136023 A1 Sep. 26, 2002

(51) Int. Cl.⁷ .................................................. B60Q 1/26
(52) U.S. Cl. ....................... 362/541; 362/503; 362/511; 362/553; 362/558
(58) Field of Search ................................ 362/541, 558, 362/307, 80.1, 503, 511, 553

(56) References Cited

U.S. PATENT DOCUMENTS

| | | |
|---|---|---|
| 5,165,772 A | 11/1992 | Wu |
| 5,481,409 A | 1/1996 | Roberts |
| 5,700,078 A | 12/1997 | Fohl et al. |
| 5,713,654 A | 2/1998 | Scifres |
| 5,771,326 A | 6/1998 | Fohl et al. |
| 5,791,757 A | 8/1998 | O'Neil et al. |
| 5,796,940 A | 8/1998 | Nagashima |
| 5,857,770 A | 1/1999 | Fohl et al. |
| 5,890,796 A | 4/1999 | Marinelli et al. |

Primary Examiner—Thomas M. Sember
Assistant Examiner—John Amarantides
(74) Attorney, Agent, or Firm—Visteon Global Tech., Inc.

(57) ABSTRACT

A light manifold assembly 10 having a relatively thin and low profile manifold 30 which is selectively placed within the frame 16 of a back window 14 and which receives light and/or laser energy 44 which is generated by a source 18 which is remotely located from the manifold 30.

11 Claims, 2 Drawing Sheets

LIGHT MANIFOLD ASSEMBLY

FIELD OF THE INVENTION

This invention relates to a light manifold assembly and more particularly, to a light manifold assembly which has a relatively thin and substantially low-profile manifold portion which selectively receives a laser signal and which utilizes the received laser signal to provide a desired pattern of light.

BACKGROUND OF THE INVENTION

Light assemblies are used in a wide variety of apparatuses to selectively provide light. For example, light assemblies are used within vehicles to selectively provide light which is indicative of the activation of the vehicle's brakes or the initiation of a turn type maneuver.

It is desirable to place the light emitting portion of one of these light assemblies upon the back window or back portion of the vehicle and to cause the deployed light emitting portion to provide light which is indicative of the braking of the vehicle. This "back window" placement has been found to increase the ability of other vehicle drivers to "take notice" of the provided braking indication and therefore facilitates communication with other drivers.

While these light assemblies are adapted to be selectively and operatively mounted within the back window or back of the vehicle, such arrangements are relatively bulky and unaesthetic due to their relatively large size and width. Particularly, this relatively large size and width is typically caused by the use of at least one light generator which is typically housed within the deployed light assembly and which selectively provides the desired light.

There is therefore a need for a light manifold assembly which overcomes at least some of these previously delineated drawbacks.

SUMMARY OF THE INVENTION

It is a first object of the present invention to provide a light manifold assembly which overcomes at least some of the previously delineated drawbacks of prior light assemblies.

It is a second object of the present invention to provide a light manifold assembly which overcomes at least some of the previously delineated drawbacks of prior light assemblies and which includes a relatively thin light manifold which may be selectively deployed within the back window and/or frame of a vehicle.

It is a third object of the present invention to provide a light manifold assembly which overcomes at least some of the previously delineated drawbacks of prior light assemblies and which further includes a relatively thin and low-profile light manifold which is adapted to be selectively deployed upon the back window frame of a vehicle and which is further adapted to receive light energy from an energy source which is remote from the deployed light manifold.

According to a first aspect of the present invention, a light manifold is provided and is selectively disposed upon a vehicle having a window and is coplanar to said window.

According to a second aspect of the present invention, a light manifold assembly is provided. The light manifold assembly includes a manifold having a longitudinal axis of symmetry; a source of light energy which is remotely located from the manifold; and a conduit which optically connects the source of light energy to the manifold and which communicates the light energy into the manifold along an axis which is perpendicular to the longitudinal axis of symmetry of the manifold.

These and other aspects, features, and advantages of the present invention will become apparent by reading the following detailed description of the preferred embodiment of the invention and by reference to the following drawings.

DETAILED DESCRIPTION OF THE PREFERRED EMBODIMENT OF THE INVENTION

Figure 1:
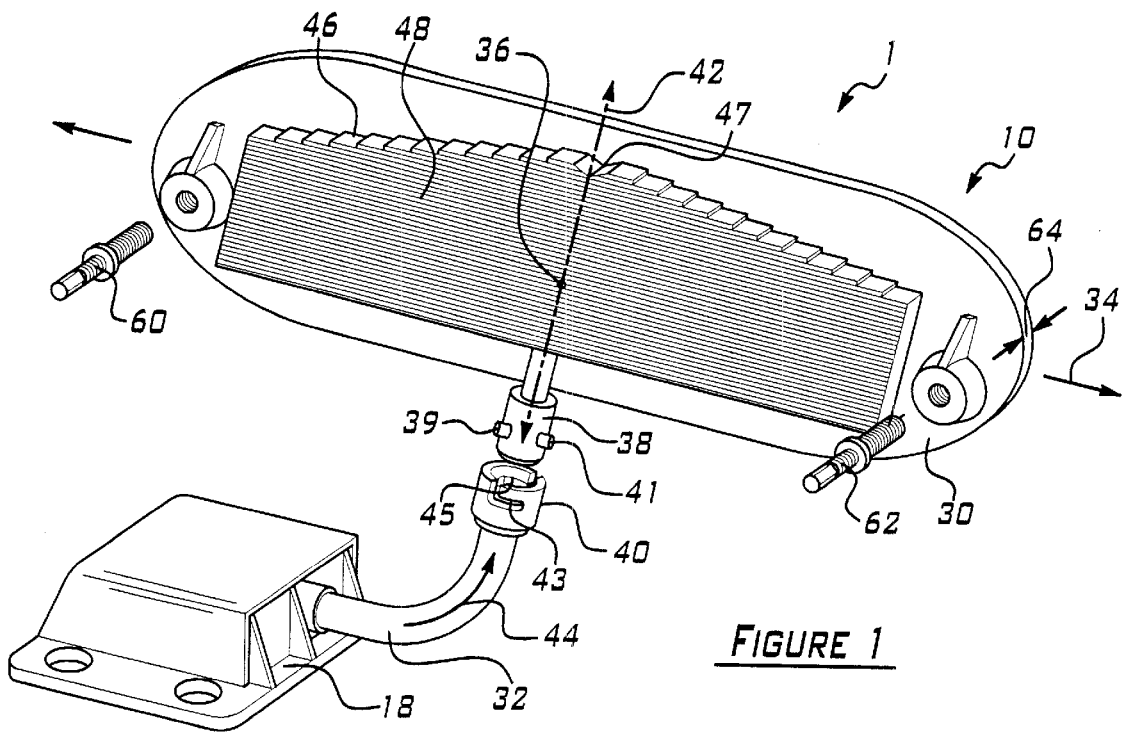
FIG. 1 is a perspective unassembled view of a light manifold assembly which is made in accordance with the teachings of the preferred embodiment of the invention.
Figure 2:
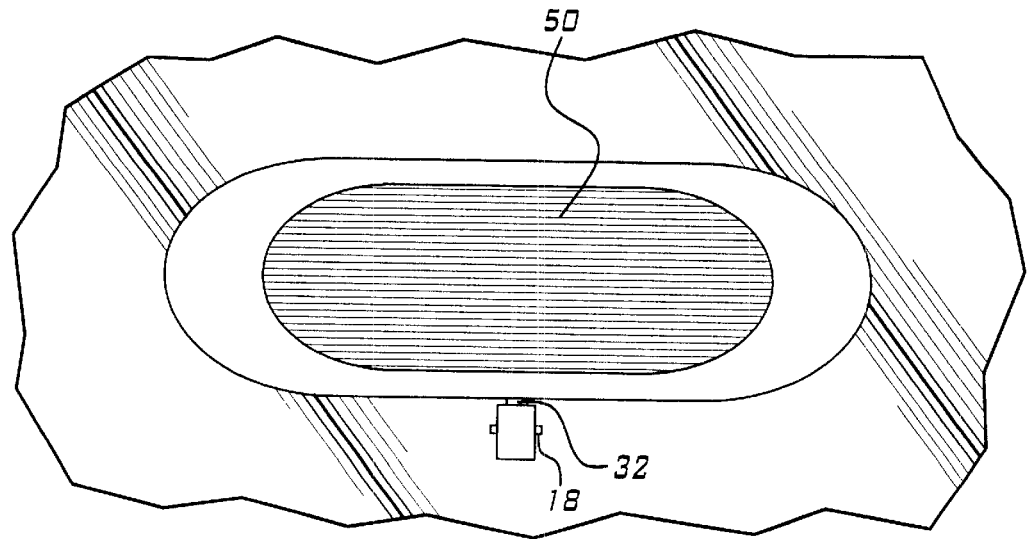
FIG. 2 is a front view of the light manifold which is shown in FIG. 1 and which is taken in the direction of view arrow 1.
Figure 3:
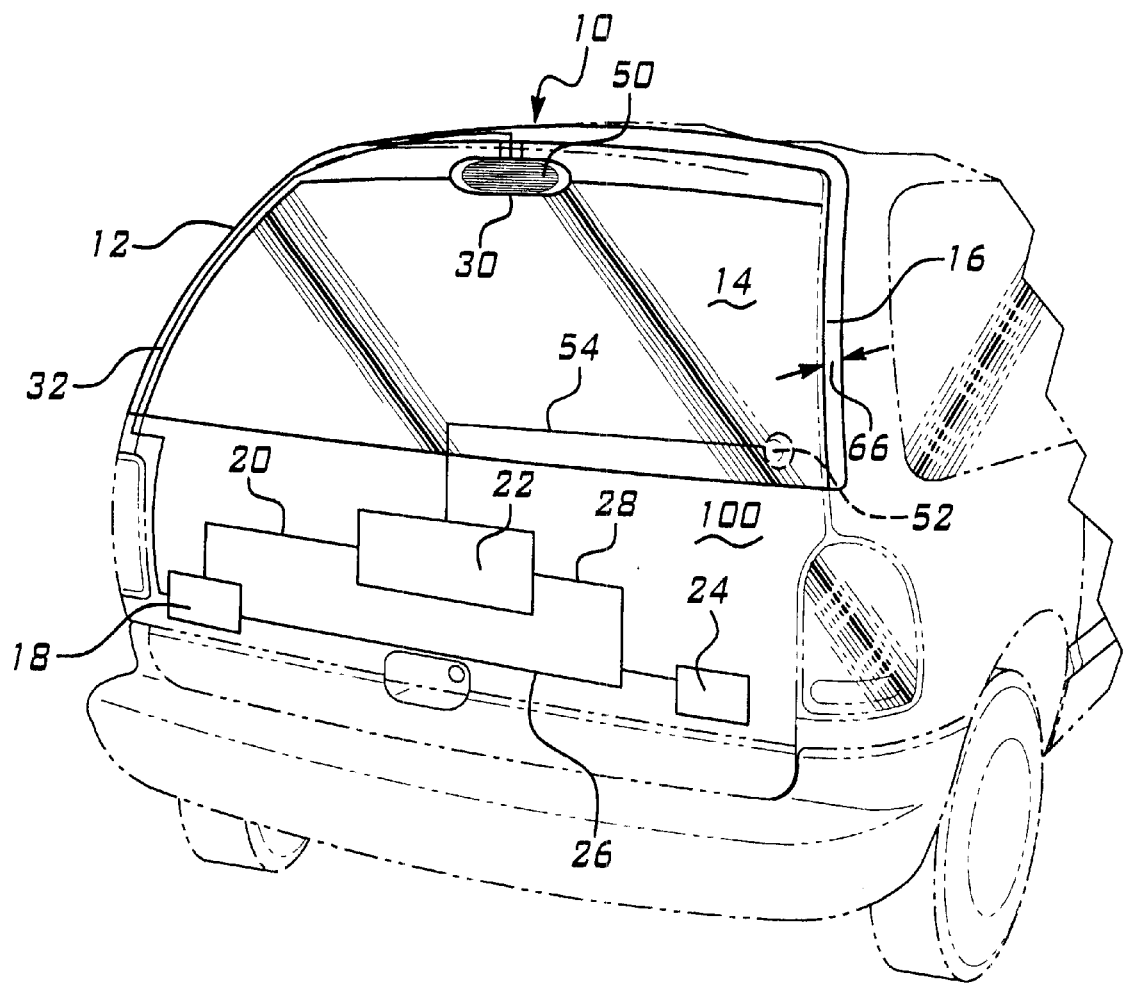
FIG. 3 is a perspective view of a vehicle employing the light manifold assembly which is shown in FIGS. 1 and 2.

Referring now to FIGS. 1, 2, and 3, there is shown a light manifold assembly 10 which is made in accordance with the teachings of the preferred embodiment of the invention and which is adapted to be selectively and operatively deployed within a conventional and commercially available vehicle 12 having a back window 14 which is contained within a window or vehicle frame 16.

As shown, light manifold assembly 10 includes an energy generator or light source 18, such as and without limitation a laser, which is physically and communicatively coupled, by bus 20, to a controller 22 which is operable under stored program control. Controller 22 and the energy generator or light source 18 are each coupled, by respective busses 26, 28, to a source of electrical energy 24 which, in one non-limiting embodiment comprises the battery of vehicle 12.

Light manifold assembly 10 further includes a relatively thin or "low profile" manifold 30 which is optically, communicatively, selectively, and physically coupled to the light generator or source 18 by use of an optical conduit or waveguide 32. Particularly, the manifold 30, in one non-limiting embodiment of the invention, has a longitudinal axis of symmetry 34 and a center point of symmetry 36 which is disposed upon the longitudinal axis of symmetry 34.

The manifold 30 further includes an integrally formed optical connector 38 which is adapted to be selectively and optically coupled to a conventional connector 40 which is integrally formed with the waveguide or optical conduit 32. Particularly, connector 38 is substantially disposed along an axis 42 which contains the center point 36 and which is substantially perpendicular to the longitudinal axis of symmetry 34. Moreover, in one non-limiting embodiment, connector 38 includes protuberances 39, 41 which are selectively insertable into the respective reception slots 43, 45, within bus 32, thereby selectively and removably securing connector 38 within the waveguide or optical conduit 32. In this manner, upon the selective connection of connectors 38 and 40, light energy 44 which emanates from the source or generator 18 is communicated into the relatively thin and low profile manifold 30 substantially along the center axis 42.

The received light energy 44 is made to impinge upon the portion 47 and is reflectively communicated to the stepped top portion 46 of light manifold assembly 10 where it is then communicated to the stepped back manifold surface 48. the received light energy 44 is then reflected and communicated to the relatively smooth front manifold surface 50 where it is communicated to the ambient environment within which the vehicle 12 resides.

In operation, when controller 22, when controller 22, by use of one or more vehicle condition sensors 52 (which are communicatively and physically coupled to the controller by bus 54), determines the existence of a certain vehicle condition (e.g., the vehicle 12 is braking), the controller 22 causes source 18, by use of a signal placed onto bus 20, to generate light or laser energy 44 and to communicate this generated light or laser energy 44 into the light manifold assembly 10 in the previously delineated manner. Hence, the generated light and/or laser energy 44 is selectively emitted from the low profile light manifold assembly 10 in response to a certain vehicle condition.

The use of a relatively high intensity light or laser source 18 which is remotely located from the manifold 30, allows the manifold 30 to be relatively thin and of a relatively aesthetically-pleasing low profile design. That is, in one non-limiting embodiment of the invention, the manifold 30 may be secured within the vehicle back window frame 16 by conventional fasteners 60, 62. Moreover, in this non-limiting embodiment, the width 64 of the light manifold 30 is substantially the same as the width 66 of the backwindow frame 16 and the manifold front surface 50 is substantially coplanar to the surface of the back window 14 and/or the backwindow frame 16. In this manner, the manifold 30 does not become or appear obtrusive or unwieldy. In other non-limiting embodiments, the light manifold may replace conventional lights and/or vehicular lamp assemblies and/or functions and may be placed upon and be substantially coplanar to surface 100.

It is to be understood that the invention is not limited to the exact construction or method which has been illustrated and discussed above, but that various changes may be made without departing from the spirit and the scope of the inventions as are more fully described within the claims.

What is claimed is:

1. A light assembly for use with a vehicle of the type having a window and a window frame having a first width, said light assembly comprising:

a manifold which is selectively disposed within said window frame and which has a certain second width which is substantially equal to said first width;

a source of light energy which is remotely located from said manifold; and a conduit which optically connects said source of light energy to said manifold and which communicates said light energy into said manifold.

2. The light assembly of claim 1 wherein said manifold is coplanar to said window.

3. The light assembly of claim 1 wherein said source of light energy comprises laser energy.

4. The light assembly of claim 1 wherein said manifold selectively generates light in response to a certain generated signal which is indicative of a certain vehicle condition.

5. The light assembly of claim 4 wherein said certain vehicle condition comprises braking of the vehicle.

6. A light manifold assembly which is selectively deployed upon a vehicle having a window and a window frame of a certain width, said light manifold assembly comprising:

a low profile manifold having a longitudinal axis of symmetry and being selectively disposed within said window frame;

a light energy generating portion; and a conduit which is coupled to said light energy generating portion and which is coupled to said low profile manifold along an axis which is perpendicular to said longitudinal axis of symmetry, and which selectively communicates light energy into said low profile manifold.

7. The light manifold assembly of claim 6 wherein said window comprises a back window and wherein said low profile manifold is coplanar to said back window.

8. The light manifold assembly of claim 6 wherein said light energy comprises laser energy.

9. The light manifold assembly of claim 7 wherein said vehicle resided within an ambient environment and wherein said laser energy is selectively communicated to said low profile manifold and is reflected by said low profile manifold to said ambient environment.

10. The light manifold assembly of claim 9 wherein said low profile manifold selectively generates light in response to occurrences of a certain condition of said vehicle.

11. The light manifold assembly of claim 10 wherein said certain condition of said vehicle comprises braking of said vehicle.

* * * * *